United States Patent

Rowse

[11] 4,179,870
[45] Dec. 25, 1979

[54] TRAILING TANDEM MOWER

[75] Inventor: Dan D. Rowse, Burwell, Nebr.

[73] Assignee: Rowse Hydraulic Rakes Company, Inc., Burwell, Nebr.

[21] Appl. No.: 815,096

[22] Filed: Jul. 13, 1977

[51] Int. Cl.$^2$ .................. A01D 75/30; A01D 55/28
[52] U.S. Cl. ........................... 56/6; 56/10.4; 56/13.7; 56/218
[58] Field of Search .......... 56/6, 10.4, 13.7, 15.5, 56/16.2, 218, 228, DIG. 15

[56] References Cited

U.S. PATENT DOCUMENTS

| 2,779,145 | 1/1957 | Smith | 56/10.4 |
| 3,109,272 | 11/1963 | Hedtke | 56/16.2 |
| 3,893,283 | 7/1975 | Dandl | 56/6 |

Primary Examiner—Russell R. Kinsey
Assistant Examiner—Robert P. Swiatek
Attorney, Agent, or Firm—Zarley, McKee, Thomte, Voorhees & Sease

[57] ABSTRACT

A pair of cutter bar-type mowers are rearwardly and laterally offset on a mower frame having steerable wheels for moving the mower between a cutting position offset from the tractor and a transport position directly behind the tractor. A spring-assisted power cylinder raises and lowers the cutting bar from a ground-engaging cutting position to a position with the cutter bar raised off the ground and then to a position with the cutter bar extending vertically for transport. The spring functions only to assist in raising the cutter bar off the ground by pivoting a frame arm and the pivoting of the cutter bar to the vertical position is by the power cylinder only. A nonbinding power takeoff drive is provided between the tractor and the mower with universal joints being provided on the tractor power takeoff and on the tongue of the mower at equal distances from the pivotal connection of the drawbar and tongue whereby the tractor turned at a 90° angle to the mower causes only a 45° angle between the drive shaft and the tongue and drawbar. Each of the mowers are adapted to break away from hitting an obstruction and the drive shaft from the first mower to the second mower includes a rearwardly extending section connected to a gear box in turn having a laterally extending section which is extendable and is connected to a gear box on the second mower pivotal with the second mower when moving between the cutting and breakaway positions.

20 Claims, 15 Drawing Figures

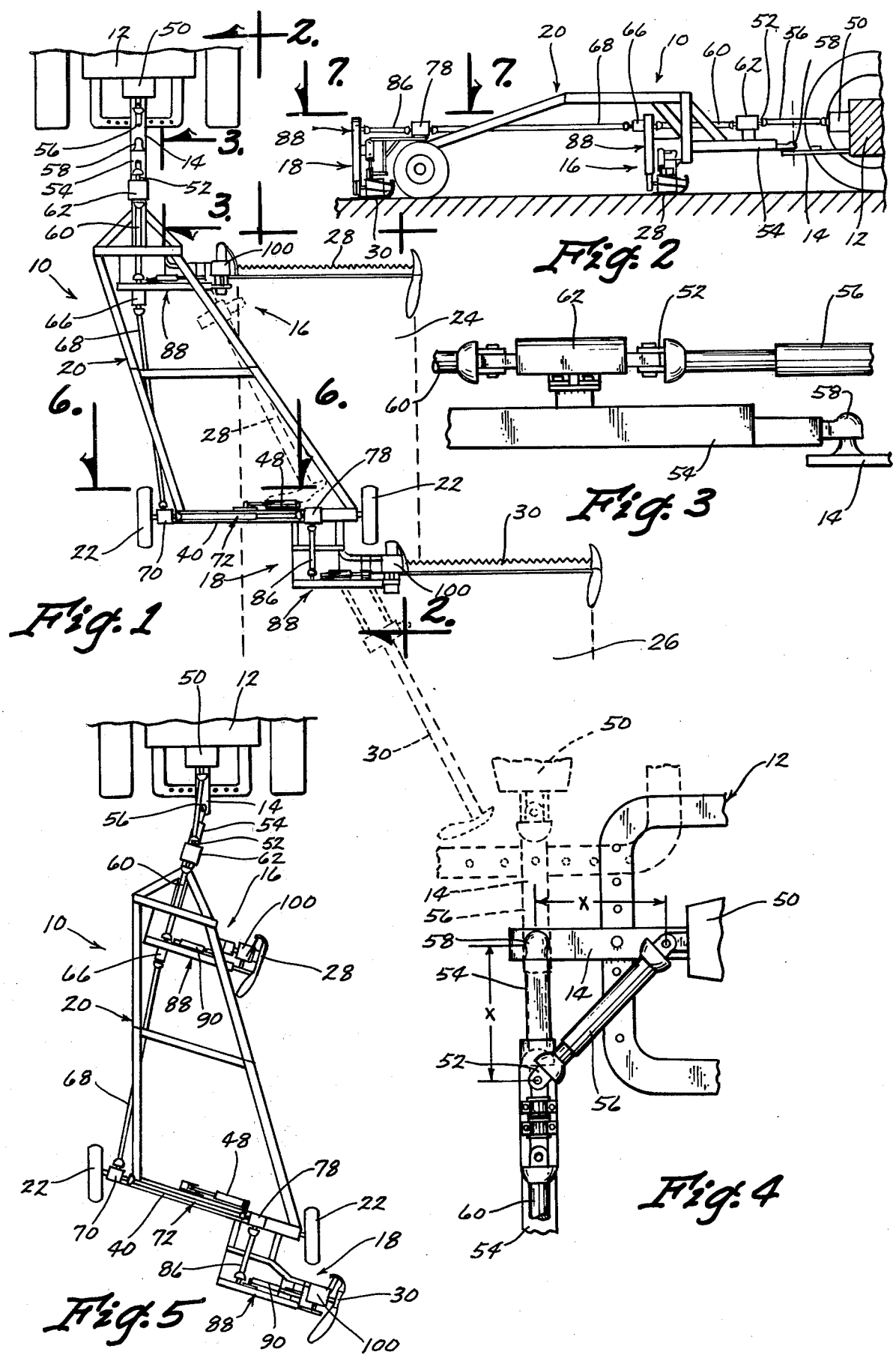

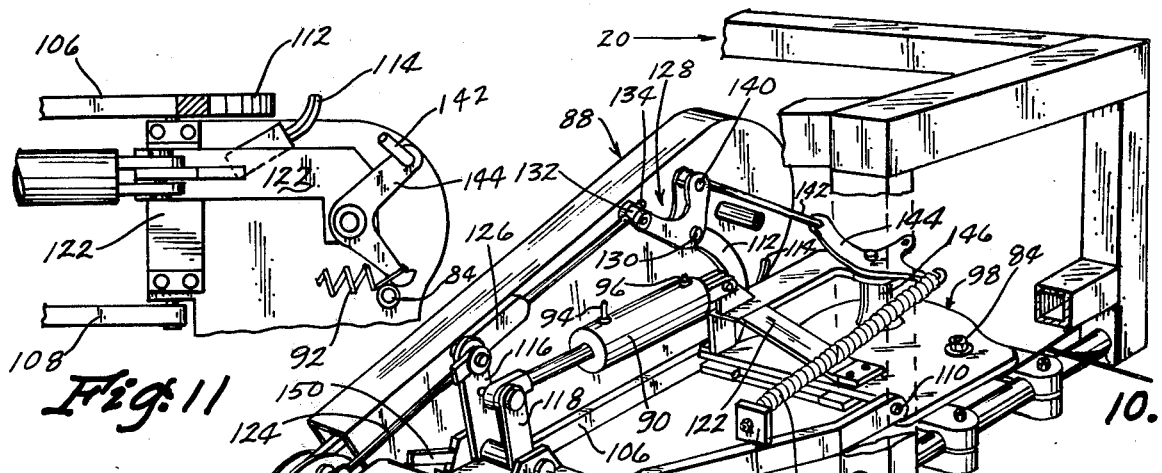
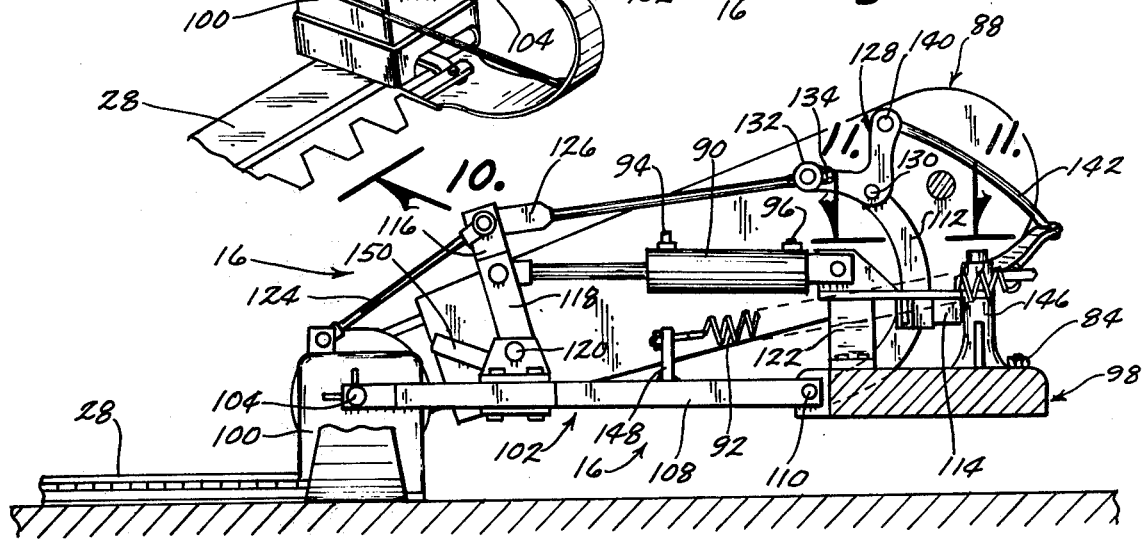
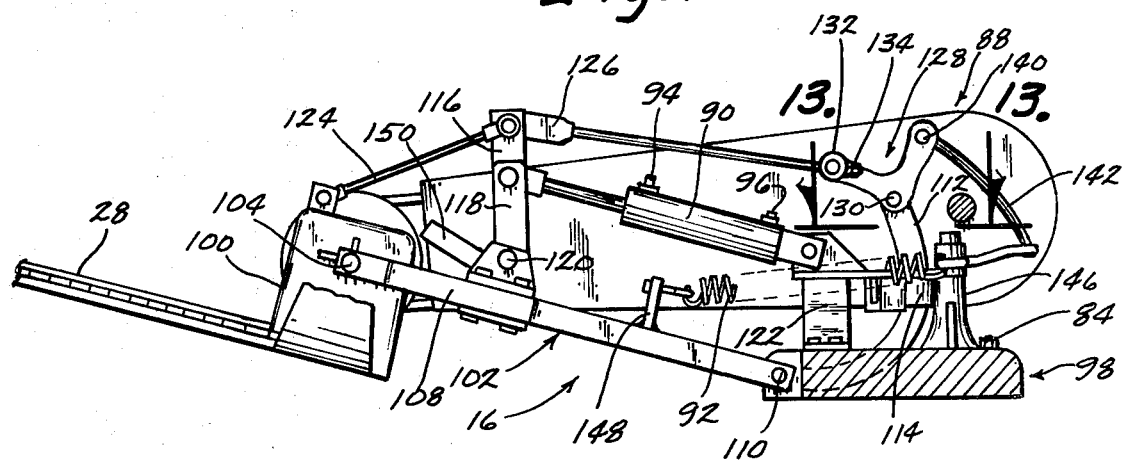

TRAILING TANDEM MOWER

BACKGROUND OF THE INVENTION

A tandem mower is desired that includes all of the advantages of a single mower but with the double-cutting capacity. The mower should have cutting bars which can float above and below the horizontal to follow the contour of the ground and can be readily raised through operation of a power means to a first position with both the inner and outer shoes off of the ground and then to a second position for transporting of the mower with the cutter bar in a vertical position. This should be accomplished with a single power cylinder.

The mower should further be readily adapted for being positioned for cutting or for transport. The mower section should also have breakaway capability such that upon the cutting bars hitting an obstruction they will pivot rearwardly but should be allowed to continue to operate in the breakaway position.

SUMMARY OF THE INVENTION

In accordance with the present invention a tandem mower is provided that allows for a single power cylinder assisted by a spring to pivot the cutting bar on a frame arm to a position with the inner and outer shoes above the ground and continued operation of the power cylinder unassisted by the spring pivots only the cutting bar to a vertical transport position. The cutting bar in its cutting position is free to float above and below the horizontal as much as 45°.

Cutting bars of 7 or 9 feet provide an effective cutting swath of 14 or 18 feet, thus requiring a long frame since the cutting bars are also rearwardly pivotable to breakaway positions upon encountering obstructions and thus the second mower must be rearwardly spaced sufficiently to allow the front cutting bar to pivot rearwardly. The width of the mower implement is substantial and obviously does not follow directly behind the tractor. Steerable support wheels are provided on the mower at the rear end which may be turned to move the mower onto the centerline behind the tractor for transport. A power cylinder operated from the driver seat is provided for moving the mower between cutting and transport positions.

The tractor may be turned 90° to the centerline of the mower without binding the power takeoff drive due to the fact that a pair of universal joints are provided on the tractor and on the mower at an equal distance from the pivot connection between the tractor drawbar and the mower tongue whereby a 90° angle between the centerline of the tractor and the centerline of the mower produces only a 45° angle between the power takeoff drive shaft connecting the tractor power takeoff to the universal joint on the mower.

Severe strain on the drive shaft connected to the rear mower is eliminated when in the breakaway position thereby allowing it to continue to operate due to the fact that the laterally extending drive shaft is made extendable and is connected to a gear box on the second mower which is pivotal with the second mower when it pivots to its breakaway position.

The mower of this invention is capable of being quickly attached and disattached from the tractor thereby freeing the tractor for other uses.

DESCRIPTION OF THE DRAWINGS

FIG. 1 is a fragmentary top plan view of the trailing tandem mower of this invention showing the mower in its cutting position.

FIG. 2 is a side elevation view thereof taken along line 2—2 in FIG. 1.

FIG. 3 is an enlarged in scale side elevation view of the nonbinding power takeoff drive shaft extending from the tractor power takeoff to the universal joint on the tongue of the mower taken along line 3—3 in FIG. 1.

FIG. 4 is a top plan view thereof showing the tractor turned 90° to the mower with the power takeoff drive shaft extending at 45° to the mower and drawbar.

FIG. 5 is a top plan view similar to FIG. 1 but showing the mower moved by the steerable wheels to the transport position following directly behind the tractor.

FIG. 9 is an enlarged fragmentary perspective view of the lift mechanism.

FIG. 10 is a cross-sectional view taken along line 10—10 in FIG. 9 and showing the mower in its cutting position.

FIG. 11 is a cross-sectional view taken along line 11—11 in FIG. 10.

FIG. 12 is a view similar to FIG. 10 but showing the mower in a raised position with the inner and outer cutting bar shoes raised off the ground.

DESCRIPTION OF THE PREFERRED EMBODIMENT

Figure 6:
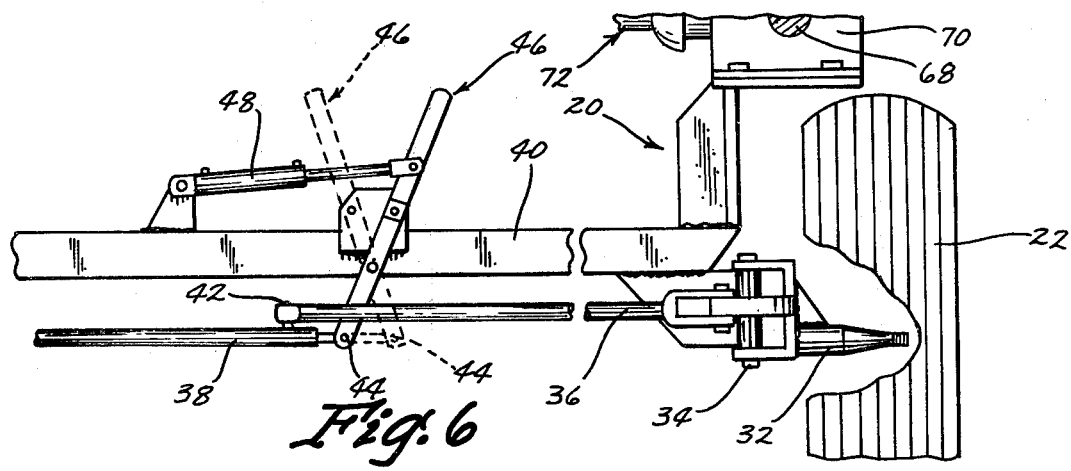
FIG. 6 is an elevational view taken along line 6—6 in FIG. 1 and illustrating the steering mechanism.

The trailing tandem mower of this invention is referred to generally in FIG. 1 by the reference numeral 10 and is shown being pulled by a tractor 12 having a drawbar 14. Front and rear sickle bar type mower units 16 and 18 are mounted on an elongated frame 20 having rear steerable support wheels 22.

The steerable wheels feature of this invention is illustrated in FIGS. 1 and 5 and allows for a pair of side-by-side swaths 24 and 26 to be cut by cutter bars 28 and 30, respectively, when the mower 10 is in its cutting position, as shown in FIG. 1. When the mower is in its transport position, as shown in FIG. 5, it trails directly behind the tractor 12 and the cutter bars 28 and 30 are in their raised transport vertical positions. In the cutting position of FIG. 1 the cutter bars 28 and 30 extend perpendicular to the line of travel of the tractor and mower while in FIG. 5, in the transport position, the longitudinal axis of the bars 28 and 30, when in their horizontal positions, would be substantially rearwardly of the right angle position of FIG. 1.

Figure 7:
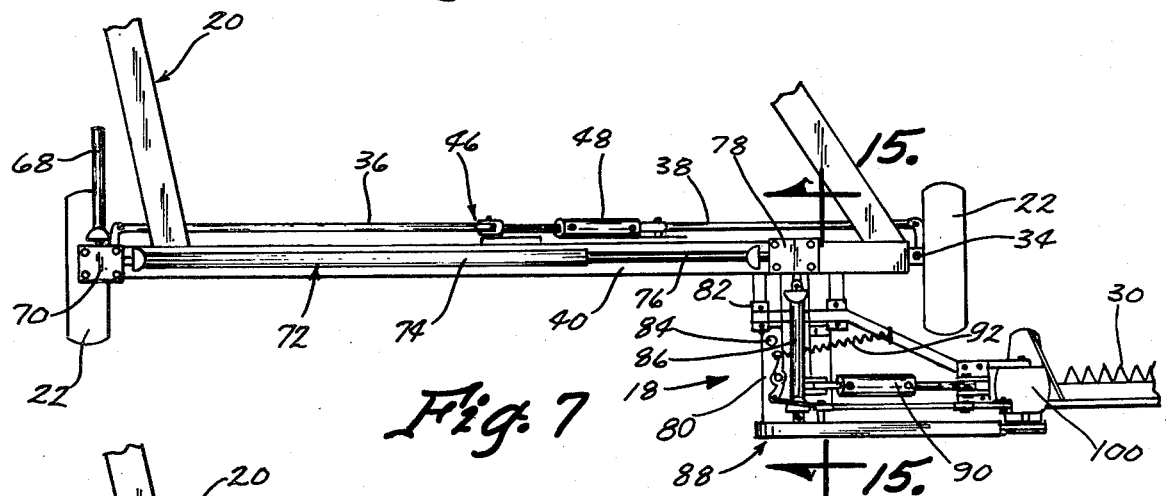
FIGS. 7 and 8 are top plan views of the second mower in the cutting and breakaway positions.
Figure 8:
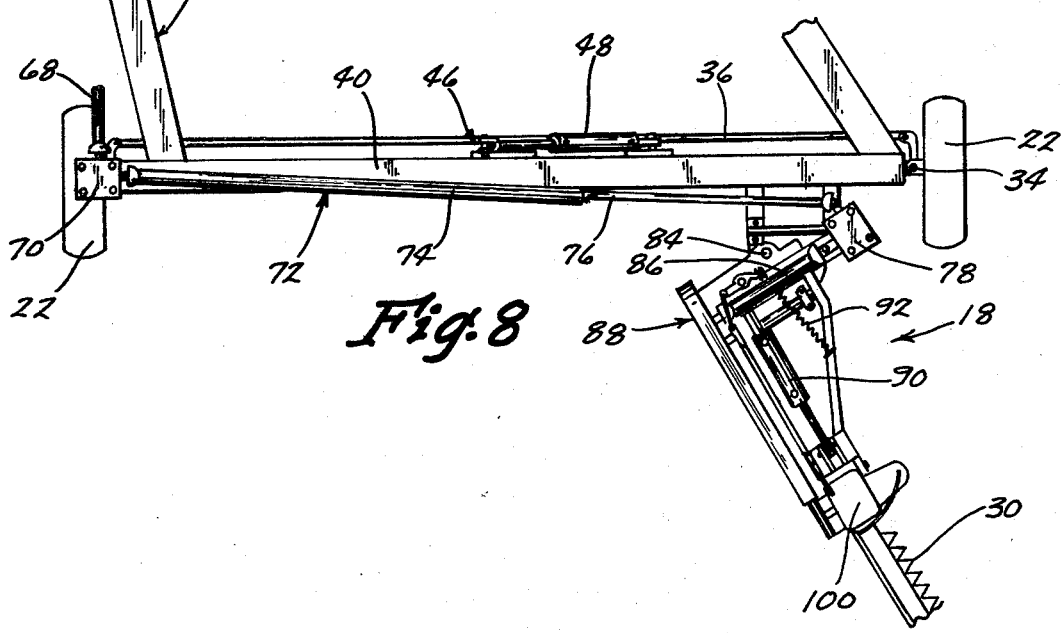
Figure 13:
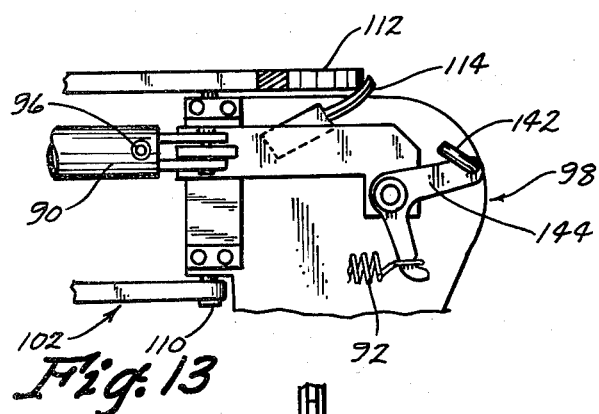
FIG. 13 is a cross-sectional view taken along line 13—13 in FIG. 12.

The steering mechanism is shown in detail in FIGS. 6-8 and shows the wheels 22 being mounted on axles 32 pivotal in a horizontal plane about an axis 34 in response to actuation from tie rods 36 and 38 extending in opposite directions from the center of the mower frame 20 and under an axle 40. The rods 36 and 38 are interconnected at 42 and rod 38 is connected to the lower end 44 of an actuating lever 46 operated by a power cylinder 48 which is capable of moving the lever 46 between the solid and dashline positions illustrated in FIG. 6. Operation of the power cylinder 48 may be accomplished from the seat of the tractor 12. The normal trailing path for the mower 10, if the wheels were freely pivotal, would be somewhere between the paths shown in FIGS. 1 and 5, and perhaps closer to the line of travel shown in FIG. 1 with the mower in its cutting position.

The power takeoff drive system for the mower allows for unrestricted turning of the tractor 90° relative to the mower without binding the power takeoff drive shaft, as seen in FIGS. 2-4, and allows for the mowers 16 and 18 to pivot out of the cutting position illustrated in the solid lines in FIG. 1, and move to a breakaway position, as illustrated by the dash lines upon the cutter bars 28 and 30 hitting an obstruction. Continuous operation of the cutter blades is permissible due to the drive shaft arrangement and design.

Referring now to FIGS. 2-4, it is seen that a power takeoff drive 50 on the tractor 12 is connected to a universal joint 52 on the tongue 54 of the mower 10 by an extendable drive shaft 56. The tongue 54 is pivotally connected to the drawbar 14 through a ball-type coupling 58 and is spaced a distance X from the U-joint 52 on the tongue 54 and is spaced the same distance X from the connection between the drive shaft 56 and the drive unit 50 on the tractor 12. Accordingly, as seen in FIG. 4, when the tractor 12 is turned 90° to the implement tongue 54, the angle between the drive shaft 56 and the implement tongue and the drawbar 14 is 45°, thus cutting in half the strain that would otherwise occur on the drive shaft 56 and the universal joint couplings.

In FIG. 1-8 the remaining portions of the drive system for operating both mowers 16 and 18 from the power takeoff drive unit 50 on the tractor 12 are shown to include a drive shaft 60 connected by a coupling unit 62 on the tongue 54 to a gear box 66 connected to the front mower 16 which in turn is connected to a drive shaft 68 connected to a gear box 70 laterally offset from the mower unit 18 at the rear of the implement. A laterally extending drive shaft 72 having telescopic portions 74 and 76 extends from the gear box 70 to a gear box 78 on a support stand 80 carried on the mower unit 18 which is pivotally connected to frame assembly 82 for pivotal movement about an axis 84, as seen in FIG. 8, to allow the mower unit 18 to pivot between the cutting position of FIG. 7 and the breakaway position of FIG. 8. A short drive shaft 86 extends rearwardly from the gear box 78 to the cutter bar drive pulley assembly 88. It is seen when the mower unit 18 pivots from the cutting position of FIG. 7 to the breakaway position of FIG. 8, the transversely extending drive shaft 72 extends and contracts through operation of the telescoping sections 74 and 76 thereby allowing the shorter drive shaft 86 to retain its same length throughout the pivoting operation. The mower cutter bar 30 may continue to be operated in the breakaway position of FIG. 8 since the angle between the drive shaft 72 and the gear box 78 is not so great that it impairs operation. The telescoping sections 74 and 76 are sufficiently long to allow the necessary telescoping action as the mower pivots between the two positions.

Figure 14:
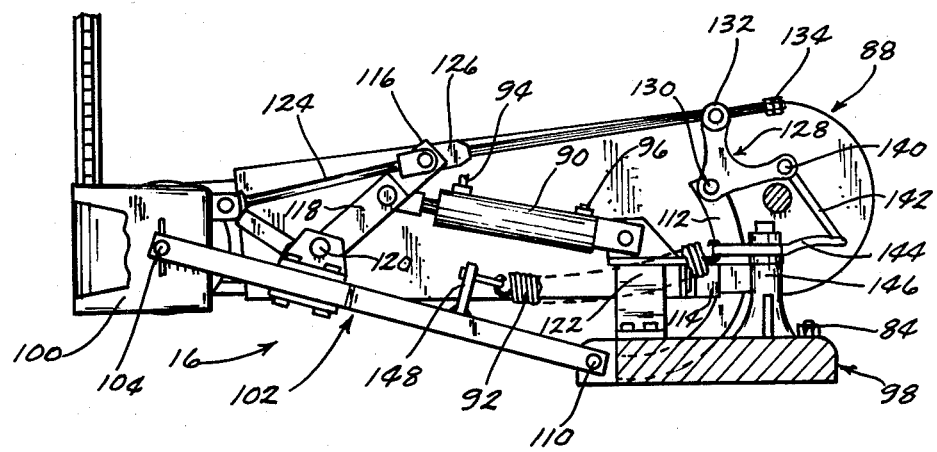
FIG. 14 is a view similar to FIGS. 10 and 12 but illustrating the cutting bar in its raised transport position.
Figure 15:
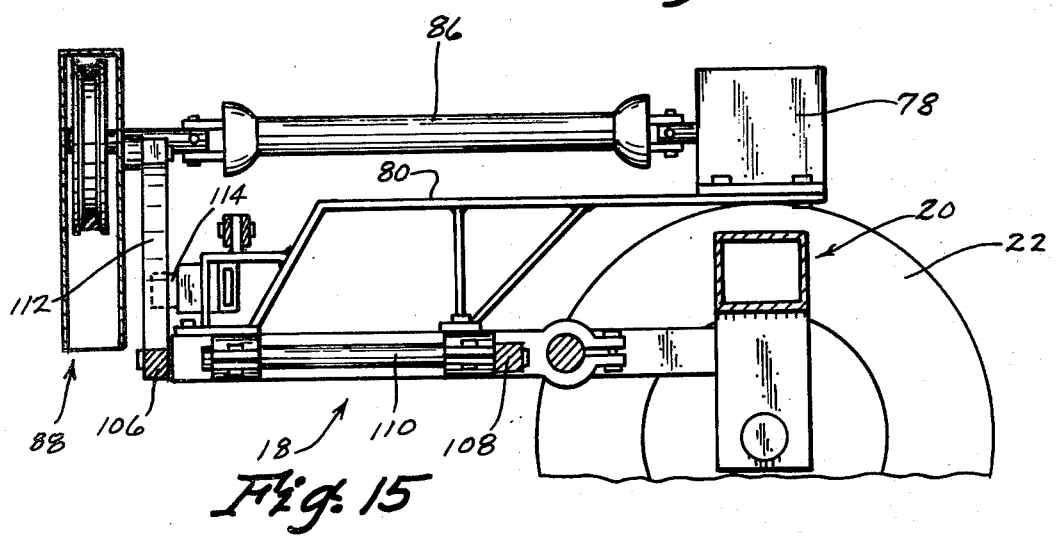
FIG. 15 is a cross-sectional view taken along line 15—15 in FIG. 7.

The lifting mechanism for each of the mowers 16 and 18 is substantially the same but is illustrated in detail relative to the front mower 16 in FIGS. 9-15. Basically, the cutter bar 28 is movable by a single acting hydraulic cylinder 90 assisted by a spring 92 between a cutting position, as seen in FIG. 10, and a raised cutting position, as seen in FIG. 12, followed by a transport position, as seen in FIG. 14, wherein the cutter bar 28 is in a vertical position having been pivoted there by the power cylinder 90 without the assistance of the spring 92. The cutter bar 28 is free to float in the cutting position of FIG. 10 as much as 45° above and below the horizontal due to the unique lifting and raising mechanism employed. Hydraulic fluid is introduced into the cylinder 90 through a line 94 and an air vent 96 is provided at the opposite end.

The mower frame 20 includes downwardly extending frame members 97, as seen in FIG. 9, connected to a conventional breakaway release mechanism 98 which provides for pivotal movement about an axis 84 for pivotal movement between the positions shown in FIGS. 7 and 8 and in the solid and dash lines in FIG. 1.

The cutter bar gear box 100 is pivotally connected to a frame arm 102 for pivotal movement about a pin 104 extending between spaced apart arm members 106 and 108. The arm 102 is pivotally connected to the release mechanism for pivotal movement about an axis 110. The arm member 106 is integral with a curved upstanding arm portion 112 and is free to move between the downwardly extending position of approximately 45° below the horizontal to an upward position wherein it engages leaf springs 114 which yieldably limit further upward pivoting action of the arm assembly 102 only.

A pair of upstanding members 116 and 118 are pivotally connected to the frame arm assembly 102 by a pin 120 with the member 118 being connected to the outer end of the hydraulic cylinder 90. The inner end of the cylinder 90 is connected to a stationary mounting bracket 122 mounted on the release mechanism 98.

The cutter bar gear box 100 is connected by a link 124 to the upstanding member 116 which moves in unison with the member 118 and in turn is connected by a link 126 to a V-shaped pivotal element 128 pivotally connected to the upper end of the curved member 112 for pivotal movement about an axis 130. The rod 126 includes a lost-motion connection 132 adapted to provide actuating forces in tension only since as seen in FIG. 14, when the mower is in its raised position the rod 126 extends through the coupling 132 and is limited in its movement in the opposite direction by nuts 134. The opposite leg 140 of the V-shaped element 128 is connected by a link 142 to a three-finger rotatable wheel element 144 rotatably mounted on a post 146. The opposite side of the wheel element 144 is connected to the spring 92 which is anchored at 148 on the frame arm assembly 102.

Thus the lifting mechanism in operation functions as follows referring to FIGS. 9-15. Hydraulic cylinder 90 is contracted and is assisted by the spring 92 and raises the cutter bar at both its inner and outer ends to the position of FIG. 12 wherein the outer end is approximately 32 inches off the ground with the inner end being approximately 16 inches off the ground. At this point the spring 92 is substantially inoperative and further operation of the power cylinder 90 serves only to pivot the cutter bar 28 to the vertical position of FIG. 14 by the member 118 through the link 124 pivoting the cutter bar 28 to the vertical position. Further, pivoting motion of the cutter bar 28 is limited by a stop 150 on the frame arm member 106 adjacent the upstanding element 116.

I claim:

1. A mower having a cutting bar pivotable between a horizontal cutting position and a vertical transport position including a lifting mechanism comprising,
   a mower frame having a laterally outwardly extending frame arm vertically pivotable,
   a cutting bar pivotally connected at its inner end to the outer free end of said frame arm,
   power means connected between said mower frame and said frame arm and said cutting bar,
   stop means in the path of pivotal movement of said frame arm and operatively engageable by said frame arm to limit vertical pivotal movement of said frame arm, and
   said power means being connected to said frame arm and said cutting bar in such a manner that a lifting force applied thereto causes said frame arm to pivot upwardly until said frame arm engages said stop means whereupon said cutting bar pivots upwardly to said vertical position.

2. The structure of claim 1 wherein said power means includes an upstanding post pivotally mounted on said frame arm outwardly of its pivotal connection to said mower frame, a link connected between said post and said cutting bar and said power means being connected to said post for pivoting said frame arm and cutting bar upwardly and then pivoting said cutting bar only.

3. The structure of claim 2 wherein said power means includes a spring means operatively connected between said mower frame and said frame arm and said spring is maintained in tension when said frame arm is pivoted downwardly and is substantially contacted when said frame arm is pivoted upwardly into engagement with said stop means whereby further actuation of said power means pivots said cutting bar only upwardly.

4. The structure of claim 1 wherein said power means includes a spring means operatively connected between said mower frame and said frame arm and said spring is maintained in tension when said frame arm is pivoted downwardly and is substantially contracted when said frame arm is pivoted upwardly into engagement with said stop means whereby further actuation of said power means pivots said cutting bar only upwardly.

5. The structure of claim 4 wherein said frame arm and cutting bar maintain the same angular relationship during the pivotal movement of said frame arm upwardly into engagement with said stop means.

6. The structure of claim 5 wherein said power means includes a power cylinder connected between said mower frame and said frame arm and said cutting bar.

7. The structure of claim 6 wherein said power cylinder allows for substantially unrestricted movement in one direction while moving in the opposite direction only when internal pressure is applied whereby said frame arm and cutting bar are free to pivot upwardly upon hitting an obstruction when in the horizontal cutting position but restricted against downward travel from the horizontal cutting position without actuation of the cylinder.

8. A tractor connected to an implement by the tractor being connected to implement tongue and the tractor power takeoff being connected to a drive shaft on the implement wherein the invention comprises,
   an implement universal joint positioned on said tongue rearwardly of the outer end of said tongue,
   a drawbar on said tractor extending rearwardly of a power takeoff universal joint with the free ends of said tongue and drawbar being pivotably connected and free to pivot in opposite directions substantially 90°,
   an extendable drive shaft interconnecting said power takeoff universal joint and said implement universal joint with the distance from said pivot connection between said tongue and drawbar to said power takeoff universal joint and to said implement universal joint being substantially equal whereby the angle said drive shaft makes with said tongue and drawbar is substantially equal as said drawbar pivots relative to said tongue such that if said tongue is turned 90° to said drawbar the drive shaft is positioned at 45° to said drawbar and said tongue.

9. A tractor pulled tandem mower having cutting bars on a mower frame offset rearwardly and laterally to provide end-to-end cutting and including steering means for moving the mower between cutting and transport positions comprising,
   a generally rigid mower frame pivotally connected through a tongue to the drawbar of a tractor,
   a pair of cutting bars on said frame offset rearwardly and laterally and pivotable between a horizontal cutting position and a vertical transport position,
   a pair of steerable wheels connected to the rear end of said frame for pivotal steering movement about respective upright axes and
   means for steering said wheels about said respective axes in unison thereby to steer said mower between cutting and transport positions with said cutting bars in said cutting position extending perpendicular to the line of travel of said tractor and mower and in said transport position extending rearwardly of said perpendicular cutting position and with said mower in said transport position and said cutting bars in their raised transport position said frame and cutting bars being positioned substantially directly behind said tractor.

10. The structure of claim 9 wherein a hydraulic cylinder is operatively connected to said steerable wheels to adjustably position them for the desired transport position or cutting position relative to said tractor.

11. The structure of claim 9 wherein the transport and cutting positions of said mower traveling behind said tractor are laterally offset on opposite sides of a normal unsteered line of travel for said mower being pulled behind said tractor.

12. A tractor pulled tandem mower having cutting bars on a mower frame offset rearwardly and laterally to provide end-to-end cutting and including drive means for operating said mowers from the tractor power takeoff when the mowers are in cutting positions or in breakaway positions, said drive means comprising,
   a first drive shaft operatively extending substantially straight back to the first mower for operation of said first mower,
   a second drive shaft extending substantially straight back from said first mower to a gear box,
   a third extendable drive shaft extending laterally from said gear box to a second gear box,
   a fourth drive shaft extending substantially straight back from said second gear box to engagement with said second mower, and
   said second mower being pivotably connected to said frame to pivot between a cutting position with its cutting bar extending laterally of the line of travel to a breakaway position with the cutting bar extending rearwardly of said lateral position and the axis of pivotable movement being positioned rearwardly of said third drive shaft whereby said second gear box moves laterally away from said first gear box extending said third drive shaft when said second mower is pivoted to said breakaway position.

13. The structure of claim 12 wherein said fourth drive shaft is substantially shorter in length than said third drive shaft and retains the same length in both cutting and breakaway positions with only said third drive shaft being extended by said second mower being pivoted to said breakaway position.

14. The structure of claim 13 wherein said fourth drive shaft and said second gear box are carried on said second mower and move as a unit which said second mower in pivoting between said cutting and breakaway positions.

15. A mower having a cutting bar pivotable between a horizontal cutting position and a vertical transport position including a lifting mechanism comprising, a mower frame having a laterally outwardly extending frame arm vertically pivotable, a cutting bar pivotally connected at its inner end to the outer free end of said frame arm, power means connected between said mower frame and said frame arm and said cutting bar, stop means in the path of pivotal movement of said frame arm to allow a limited vertical pivotal movement, and said power means being connected to said frame arm and said cutting bar in such a manner that a lifting force applied thereto causes said frame arm to pivot upwardly until said frame arm engages said stop means whereupon said cutting bar pivots upwardly to said vertical position, said power means including an upstanding post pivotally mounted on said frame arm outwardly of its pivotal connection to said mower frame, a link connected between said post and said cutting bar and said power means being connected to said post for pivoting said frame arm and cutting bar upwardly and then pivoting said cutting bar only, said power means including a spring means operatively connected between said mower frame and said frame arm and said spring is maintained in tension when said frame arm is pivoted downwardly and is substantially contracted when said frame arm is pivoted upwardly into engagement with said stop means whereby further actuation of said power means pivots said cutting bar only upwardly, said spring being connected directly at one end to said frame arm and its other end being connected to one side of a horizontally rotatable wheel on said mower frame with the other side being operatively connected to said post whereby said spring maintains a lifting force on said frame arm at two separate points.

16. The structure of claim 15 wherein said operative connection of said wheel to said post provides a greater lifting leverage on said frame arm than said spring connection to frame arm.

17. The structure of claim 16 wherein said connection of said wheel to said post includes linkage connected therebetween with said post being positioned on said frame arm outwardly of said spring connection to said frame arm thereby providing greater leverage.

18. The structure of claim 17 wherein said linkage connected between said wheel and said post includes said linkage being connected at the upper free end of said post to provide maximum leverage for lifting said frame arm and cutting bar.

19. The structure of claim 18 wherein said linkage includes a lost motion connection to allow unrestricted pivoting of said cutting bar after said frame arm engages said stop means.

20. The structure of claim 19 wherein said stop means is a yieldable spring means.

* * * * *